United States Patent [19]

DeLuca

[11] Patent Number: 5,029,778
[45] Date of Patent: Jul. 9, 1991

[54] THROTTLE CONTROL SYSTEM HAVING REAL-TIME-COMPUTED THRUST VS THROTTLE POSITION FUNCTION

[75] Inventor: Brian L. DeLuca, Seattle, Wash.
[73] Assignee: The Boeing Company, Seattle, Wash.
[21] Appl. No.: 445,584
[22] Filed: Dec. 4, 1989

Related U.S. Application Data

[63] Continuation-in-part of Ser. No. 405,810, Sep. 11, 1989.
[51] Int. Cl.⁵ .............................................. B64C 13/04
[52] U.S. Cl. .................................... 244/234; 244/175; 244/220; 74/491
[58] Field of Search ............... 244/234, 175, 220, 221, 244/228, 230, 236; 60/243, 39.281; 74/491; 200/61.89, 61.9, DIG. 32, 51, 85; 364/431.01

[56] References Cited

U.S. PATENT DOCUMENTS

| | | | |
|---|---|---|---|
| 1,909,182 | 5/1933 | Lanagan | 244/234 X |
| 2,901,919 | 9/1959 | Cravero | 74/491 |
| 4,567,786 | 2/1986 | Sakurai | 244/220 X |
| 4,574,651 | 3/1986 | Nordström | 244/234 X |
| 4,651,954 | 3/1987 | Miller | 244/234 X |
| 4,686,825 | 8/1987 | Cavasa et al. | 60/39.281 X |
| 4,901,952 | 2/1990 | Curtis | 244/234 |

FOREIGN PATENT DOCUMENTS

137610 4/1985 European Pat. Off. ............ 244/228

Primary Examiner—Margaret A. Focarino
Assistant Examiner—James M. Kannofsky
Attorney, Agent, or Firm—R. H. Sproule; B. A. Donahue

[57] ABSTRACT

A throttle controller includes a manual mode where engine output is a function of throttle lever angle, and an alternatively selectable Speed Hold/Thrust Hold mode which is initiated when the throttle is placed in a center Hold position. Throttle operation during the Speed Hold mode is governed by (i) a selected speed entered at a mode control panel, or (ii) a speed existing when the lever was placed in the Hold detent, given that no speed is entered and selected at that mode control panel or (iii) a selected speed/thrust designated in a flight plan entered into the aircraft's flight management computer. During the Thrust Hold mode, the throttle controller maintains the level of thrust which existed when the throttle lever was placed in the Hold detent. When out of the Hold detent, the controller operates to control output thrust as a function of Throttle Lever Angle (TLA). Failure of the Speed Hold mode or Flight Plan mode, causes autothrottle operation to default through a priority scheme, which generally results in a mode where the airspeed existing at the time of failure is maintained. In order to allow the pilot to make very small changes in engine thrust without increasing the total range of throttle movement, every time the throttle is placed in the center Hold position a new thrust versus throttle lever angle function is calculated to afford increased throttle movement sensitivity.

9 Claims, 6 Drawing Sheets

THROTTLE CONTROL SYSTEM HAVING REAL-TIME-COMPUTED THRUST VS THROTTLE POSITION FUNCTION

CROSS REFERENCE TO A RELATED APPLICATION

This application is a continuation-in-part of application Ser. No. 07/405,810 filed Sept. 11, 1989, pending, entitled "Throttle Control System Having Manual and Automatic Modes of Operation".

TECHNICAL FIELD

The present invention pertains to a throttle control system for an aircraft, and more particularly to a digitally interfaced fly-by-wire or fly-by-light throttle control system which has a first operational mode for providing manual control of engine output and a second operational mode for providing automatic control of engine output.

BACKGROUND OF THE INVENTION

Most conventional aircraft engine throttle control systems regulate engine output by means of a throttle lever which is manually positioned by the pilot. The commanded position of the throttle lever is mechanically transmitted to the aircraft engine via a number of cams, gears, pulleys and cables in order to regulate engine output. Some aircraft have autothrottle control systems which adjust the engine output to maintain, for example, a selected airspeed. During autothrottle operation, the throttle lever is repositioned by the autothrottle controller instead of the pilot, so that (i) the position of the throttle lever (e.g., throttle lever angle) is mechanically transmitted to the engine and (ii) the throttle lever angle is consistent with the current output of the engine. During such autothrottle operation, the throttle lever angle provides feedback to the pilot as to the output of the engine. Autothrottle operation is often initiated from a separate control panel in the cockpit.

Disadvantages of these conventional throttle control systems include both their mechanical complexity and their high weight, both of which adversely affect initial manufacture, installation, and subsequent maintenance. Furthermore, autothrottle operation and mode selection are often initiated from a separate control panel in the cockpit which detracts somewhat from their convenience.

It is therefore desirable to provide a throttle control system which overcomes the disadvantages of conventional throttle control systems.

SUMMARY OF THE INVENTION

The present invention pertains to a throttle controller for an aircraft engine. The throttle controller has throttle control means which includes means for sensing a position of a throttle lever which is movable between a first position and a second position in a manner that there are a plurality of intermediate throttle lever positions between the first position and the second position.

The throttle controller also includes means, which are responsive to the sensed position signal, for generating a control signal for controlling an output level of the engine as a function of the throttle lever position. The control signal generating means includes means for generating the control signal in a manner (i) such that the intermediate throttle lever positions between the first position and the second position select a first range of engine output levels and (ii) such that a reference position of the throttle between the first throttle position and the second throttle position selects a mode of engine operation in which the engine output level is maintained at a selected level. The control signal generating means also includes means, which are responsive to the sensed position signal of the throttle lever in the reference position, for generating control signals for selecting a second range of engine output levels (i) which corresponds to the intermediate throttle lever positions, and (ii) which replaces the first range of engine output levels. The control signals are generated in a manner that when the throttle lever is moved from the reference position to the intermediate throttle lever positions, the second range of engine output levels is selected.

Other details of the invention will be explained hereinafter.

BRIEF DESCRIPTION OF THE DRAWINGS

The present invention will be described in greater detail by referring to the following detailed description in conjunction with the attached drawings, in which.

DETAILED DESCRIPTION

Figure 1:
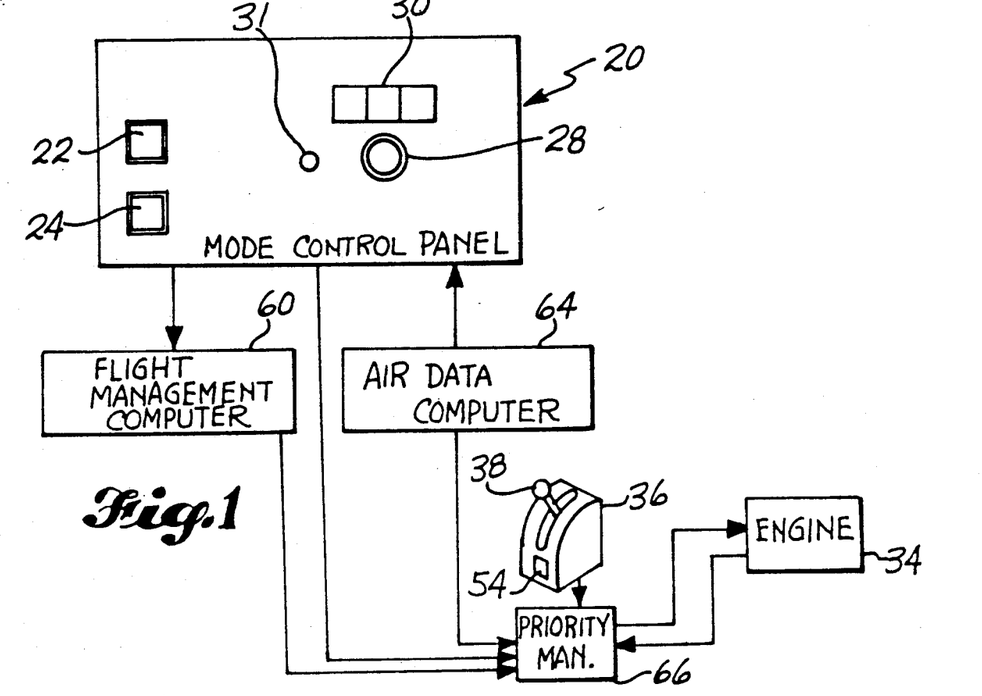
FIG. 1 is a simplified block diagram of the throttle control system of the present invention.

Reference is made to FIG. 1 where there is shown an exemplary embodiment of the throttle control system of the present invention. The system includes a mode control panel (MCP) indicated at 20 including a Speed Hold/Thrust Hold mode select button 22 and a Flight Plan engage button 24. The MCP 20 also includes a knob 28 for manually dialing a desired airspeed or Mach number at a window 30, as well as a Mach/airspeed function selection button 31. In order to select additional operating modes or to manually control the output of an aircraft engine 34 there is provided a throttle stand indicated at 36 having a lever 38.

Figure 2:
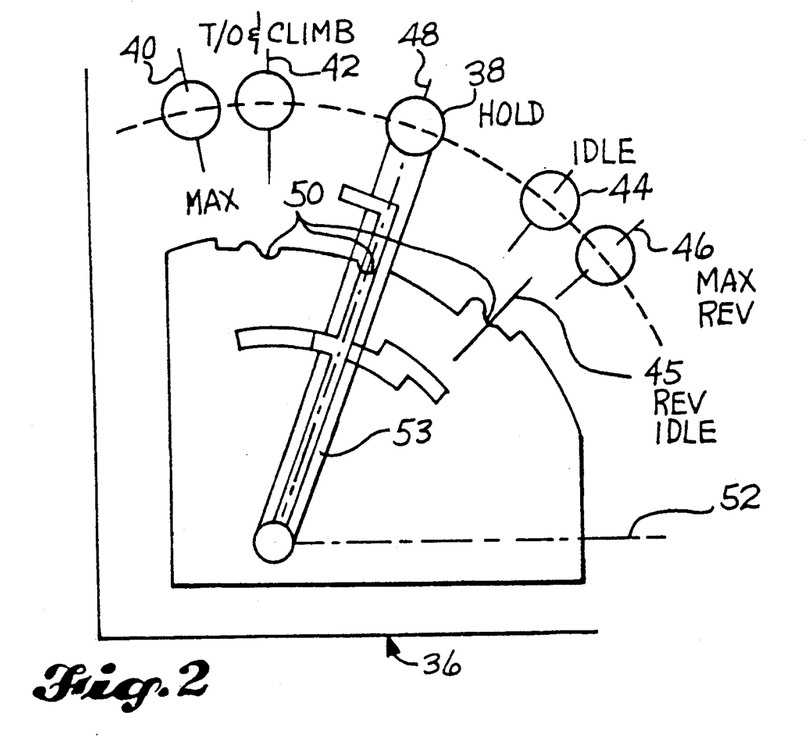
FIG. 2 is a side view of a throttle lever which forms a portion of the throttle control system.

As shown more clearly in FIG. 2, the throttle control system includes the movable lever 38 which operates between a number of conventional positions such as a maximum thrust position identified by a number 40, a takeoff and climb position 42, an idle position 44, a reverse thrust at idle power position 45, and a maximum reverse thrust position 46. The throttle lever includes a Hold position 48, which is approximately midway between the idle position 44 and the takeoff & climb position 42. In the present invention, positions 40, 42, 44, 45 and 48 are also mode selectors. For example, when the throttle is moved to position 40 a preprogrammed maximum thrust value is used in a conventional manner to control engine output. Similarly, when the throttle is moved to positions 42, 44 or 45 preprogrammed values for takeoff and climb, idle or reverse thrust at idle are retrieved to control engine operation. In addition, position 42 selects takeoff or climb thrust levels which may be full-rated or derated levels which are obtained from other avionics systems on board the aircraft in a conventional manner. At each position 50 there is a detent which holds the throttle lever until moved by the pilot. In the present application, an angle formed in a counterclockwise direction between an imaginary horizontal line identified by a number 52 (FIG. 2) and the longitudinal axis of the throttle lever, identified by the number 53, is referred to as the throttle lever angle (TLA).

In the present invention, when the throttle lever is not in the Hold position 48, engine operation is defaulted to a Thrust vs. TLA mode, and thrust is a direct function of the throttle lever angle. The controller includes another Speed Hold/Thrust Hold select button 54 (FIG. 1) which may be conveniently located on the throttle stand 36. This button 54 is functionally identical to the Speed Hold/Thrust Hold select button 22 located on the MCP. Whichever of these buttons 22 or 54 is activated last has priority.

When the Speed Hold mode is selected by the buttons 54 or 22 and the throttle lever is in position 48 (Hold), aircraft thrust is automatically controlled to maintain selected airspeed or Mach in the following sequential order: (i) Flight Plan speed or Mach if available from the aircraft flight management computer and engaged via MCP button 24, (ii) speed or Mach set in MCP window 30 if engaged via button 22, and (iii) if neither (i) nor (ii) are available due to a loss of signal, the current aircraft airspeed or Mach existing at the instant of loss of (i) or (ii). More specifically, when the failure occurs, the aircraft airspeed at the time of failure is retrieved from a conventional air data computer 64 (FIG. 1). Using a conventional error loop, the engine output is adjusted to hold this airspeed until the throttle is moved from the Hold detent or until the failure is corrected.

When the throttle is advanced or retarded through a selected angle (out of Hold), the aircraft airspeed is increased or decreased due to a thrust change which is proportional to the change in TLA. To aid the pilot in identifying the speed and thrust changes corresponding to the change in TLA, the commanded speed and thrust may be displayed by "bugs" or pointers (not shown) on the pilot's airspeed indicator and thrust indicator, respectively. In this manner, the pilot can adjust the TLA to achieve the desired airspeed change.

Although it is not a part of the present invention, many modern commercial aircraft such as the Boeing 757/767 include a flight management computer (FMC) identified by a number 60 in FIG. 1. The FMC software contains the necessary navigational waypoints, airspeeds, thrust settings, and altitudes to control the flight of the aircraft from takeoff through landing approach. When the Flight Plan button 24 is engaged in order to control the aircraft flight, one of the data outputs from the FMC 60 is either a commanded airspeed, commanded Mach or a commanded thrust (depending upon whether the FMC program has required a commanded thrust or airspeed/Mach to control engine output during that leg of the flight).

In order to accomplish these tasks, the present invention includes a unique priority manager indicated by a control block 66 (FIG. 1). The priority manager is a microprocessor-based controller which operates in accordance with the flow chart set forth in FIG. 3. More specifically, the priority manager 66 determines whether there is a signal output from a conventional position sensor (not shown) connected to the throttle lever (decision block 70). If no signal is detected, then a failure alert is displayed on a flight deck display panel (not shown). However, if a signal is detected, then a determination is made whether the throttle lever is in the Hold position (decision block 72). If the throttle is not in the Hold position, then aircraft thrust is regulated as a function of TLA (flowblock 73) regardless of the positions of Speed/Thrust selection buttons 54 or 22.

Figure 3:
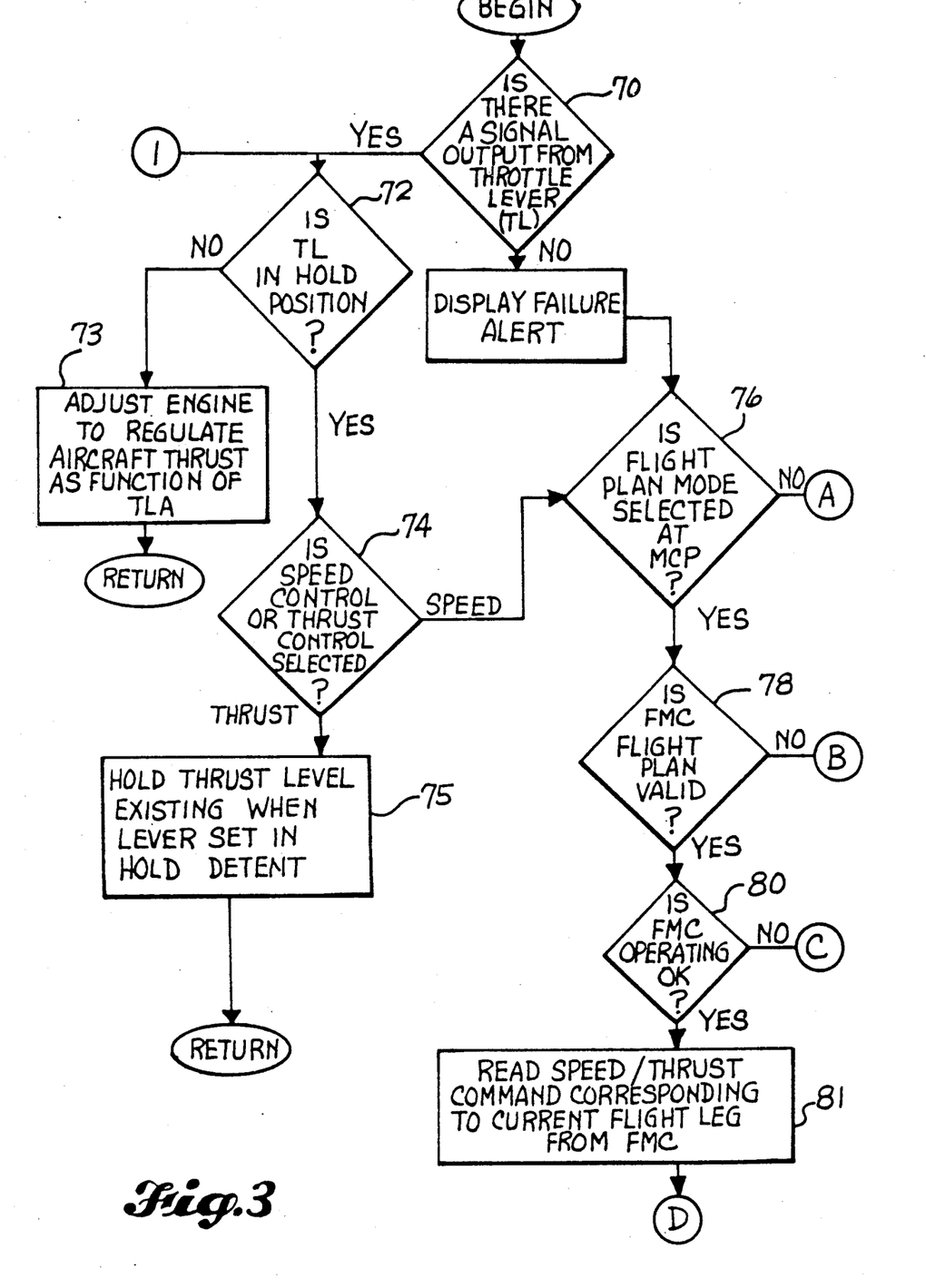
FIGS. 3 and 4 are flowcharts describing operation of the throttle control system.

If the throttle lever is in the Hold position, then the position of the Speed/Thrust buttons 54 or 22 is determined (decision block 74). In the event the Thrust Hold control mode has been selected, then engine output is adjusted to hold the engine thrust that was being generated when the throttle lever was placed in Hold (flowblock 75). If the throttle lever is in the Hold position, and the position of button 54 or 22 is changed from Speed Hold to Thrust Hold, then thrust is maintained at the level present when such switch selection was made. Conversely, if the Speed Hold control mode has been selected (throttle lever is in Hold and buttons 54 or 22 have selected Speed Hold), then thrust is modulated to maintain the speed (or Mach) which existed when those tasks were accomplished.

Furthermore, in the event that either i) the Speed Hold mode is selected when the throttle lever is in the Hold position (at decision block 74), or ii) there is no signal output from the throttle lever (at decision block 70), then a determination is made (decision block 76) whether the Flight Plan mode has been selected at the mode control panel. If the Flight Plan button 24 on the MCP has been selected, then a determination is made (decision block 78) whether the FMC flight plan data is valid. This determination is made by a separate system which is not part of the present invention.

Once it is determined that the flight plan data is valid, then a conventional built-in self check of the FMC is performed to ensure the FMC is operating properly (decision block 80). If the self check is satisfactory, then the programmed airspeed, Mach or thrust command corresponding to the current flight leg of the aircraft is obtained from the FMC (flowblock 81). This airspeed, Mach, or thrust command is compared to the current airspeed, Mach (obtained from the air data computer 64) or engine thrust to generate an error signal. This error signal is fed to a controller (not shown) on the engine which controls the operation of the engine in a conventional manner (flowblock 82 in FIG. 4). Further descriptions of navigational operating modes in the FMC are provided in U.S. Pat. No. 4,692,869 entitled "Aircraft Navigational Systems and Methods for Creating Navigational Guidepoints", as well as U.S. Pat. No. 4,792,906 entitled "Navigational Apparatus and Methods for Displaying Aircraft Position With Respect To A Vertical Flight Path Profile"; both of which are assigned to the assignee of the present invention.

Figure 4:
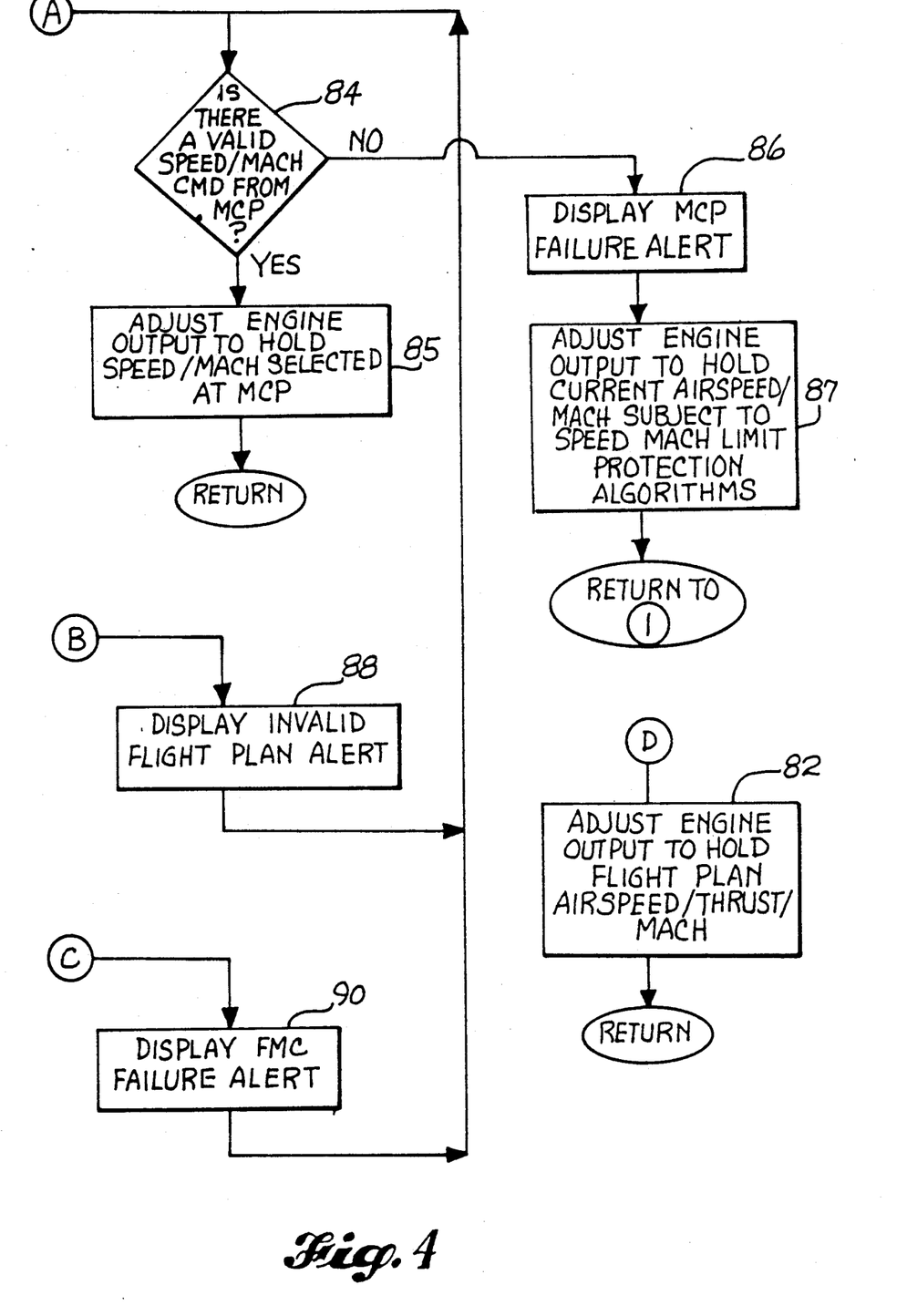

In the event the Flight Plan mode has not been selected at the mode control panel (decision block 76 in FIG. 3), a determination is made whether the mode control panel is generating a valid speed/Mach command (decision block 84 in FIG. 4). This is accomplished by comparing the generated speed/Mach command with established parameters in a conventional manner. If the speed command is determined to be valid, then the engine output is adjusted to hold the speed/Mach selected at MCP window 30 (flowblock 85).

On the other hand, if the speed command from the MCP is not valid (decision block 84), an MCP failure alert is displayed (flowblock 86) and the engine output is adjusted to hold the current airspeed of the aircraft subject to conventional overriding speed/Mach limit protection algorithms (flowblock 87).

In the event the FMC flight plan is not valid (decision block 78 in FIG. 3) or the FMC is not operating properly (decision block 80), a failure alert is displayed (flowblocks 88, 90 in FIG. 4) to alert the pilot. Operation then flows to the decision block 84 where a determination is made whether a valid speed/Mach command is coming from the MCP.

As shown in the flowchart illustrated in FIGS. 3 and 4, the priority manager controls autothrottle operation by interrogating the throttle lever and the mode control panel. In the event of an unsatisfactory response from either of them, the priority manager ensures the current airspeed of the aircraft is maintained (subject to preprogrammed limit protections) until the pilot can respond to the failure alert and take corrective action.

Figure 5:
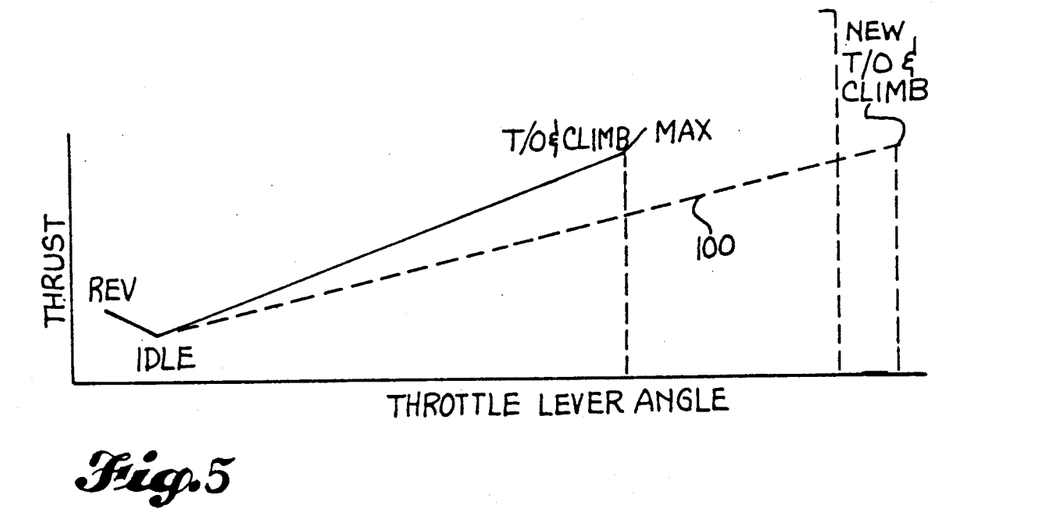
FIG. 5 is an exemplary graph of engine thrust as a function of throttle lever position (TLA) for a conventional throttle system.

Having described the overall operation of the controller, a description of its other features now will be provided. Some modern jet aircraft may have aerodynamic surfaces which are so free of drag (clean) that changes in TLA and resultant thrust, which are small by conventional standards, can cause large changes in aircraft airspeed. More precisely, many conventional throttles are unable to make small enough changes in position to avoid making large changes in aircraft speed. An obvious solution to this problem is to increase the range or distance (TLA) that the throttle moves when travelling between idle and takeoff thrust. In this manner, the ratio of the change in engine thrust to the change in TLA is decreased (i.e., decreased slope of Thrust v TLA line 100 shown in FIG. 5). This allows a smaller incremental change to be made in engine thrust for the same amount of throttle lever movement. A disadvantage of this approach is that it significantly increases the total travel (i.e., TLA and linear displacement of the throttle lever knob) of the throttle, as shown more clearly in FIG. 5. This increased range of throttle movement may be beyond the limits of convenient manipulation by the pilot.

Figure 6:
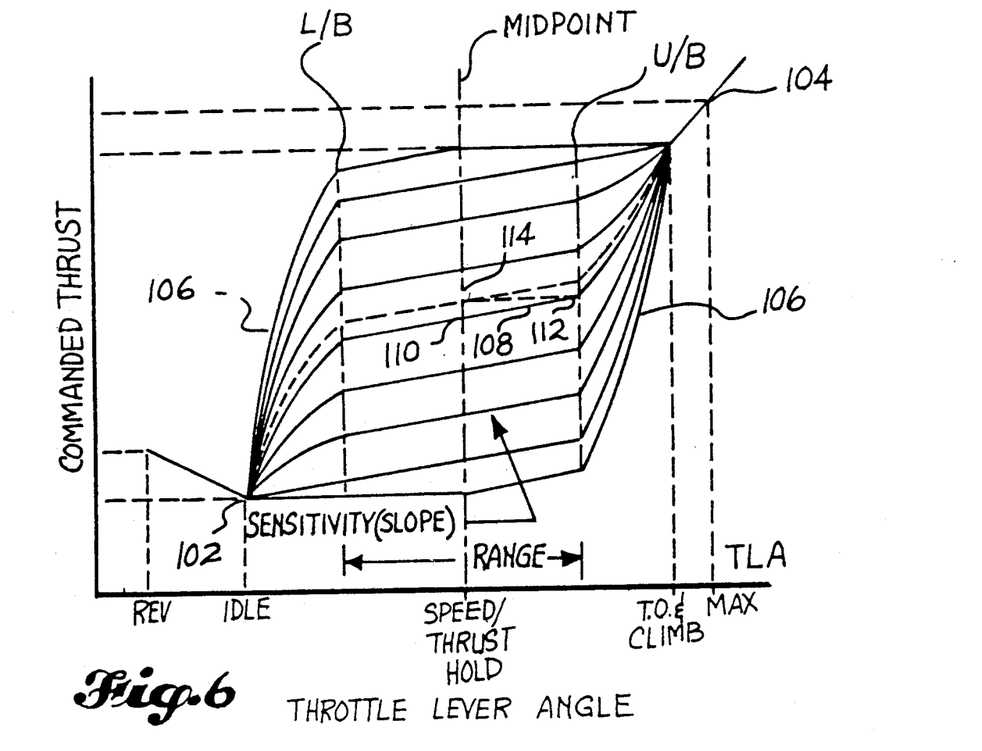
FIG. 6 is an exemplary "folded scale" graph of engine thrust as a function of TLA for the throttle system of the present invention.

In an exemplary embodiment shown in FIG. 6, there is provided a real time computed "folded" scale which provides a constant sensitivity about the Hold position of the throttle lever. That is, each time the throttle is placed in the Hold detent, the commanded thrust as a function of TLA is recomputed by a microprocessor-based throttle controller located in the priority manager 66 (FIG. 1). This is accomplished so that (i) the center or midpoint of the thrust vs. TLA function is coincident with the Hold detent, and (ii) there is a constant positive slope between an upper range boundary U/B and a lower range boundary L/B. At the range boundaries, the constant positive slope line is faired into an idle point 102 and a take-off-and-climb point 104. In this manner, there always exists a full forward range and a full rearward range about the Hold (center detent) position. At the faired ends 106, there is much less sensitivity (steep slope) and therefore small changes in throttle lever angle generate large changes in thrust. An assumption is made at the faired ends that sensitivity is not necessary, and that, most likely, large changes in thrust are desired by the pilot at these throttle lever angles. Although a representative family of lines is shown in FIG. 6, only one complete line exists at any instant.

In operation, moving the throttle lever out of the Hold detent begins thrust vs TLA operation along line 108 from point 110 to point 112. This results in an increase in commanded thrust. Returning the throttle lever to the Hold detent (i) when operating in the Speed Hold mode causes the controller to hold the current airspeed of the aircraft existing at the time the throttle lever is returned to the Hold detent, and (ii) when operating in the Thrust Hold mode causes the controller to hold the current thrust of the aircraft existing at the time the throttle lever is returned to the Hold detent. A new thrust vs. TLA curve 113 (straight line with faired end curves) is computed around the Hold detent (point 114) at the new thrust level in FIG. 6.

Computation of each thrust vs. TLA curve is accomplished by an algorithm in the throttle controller. The algorithm is developed as function of such parameters as engine responsiveness, change in airspeed as a function of change in engine thrust, desired TLA range of motion considering ability to control small incremental TLA inputs, and established thrust limits for reverse, idle, climb and maximum which are unique to the engine in question.

More specifically, using the cartesian coordinate general equation for a straight line, $y = mx + b$, the straight line connecting the upper range boundary (U/B in FIG. 6) and the lower range boundary (L/B) may be computed in real time immediately following the placement of the throttle lever in the Hold detent. When the throttle lever is moved out of the Hold detent, y is recalculated using the newly sensed throttle position x, the throttle sensitivity constant m, and the most recent current engine thrust value b. When operating in the Thrust Hold mode, b equals the engine thrust existing when the throttle is placed in the Hold detent. On the other hand, when operating in the Speed Hold mode, b equals the thrust required to hold the existing speed of the aircraft when the throttle is placed in the Hold detent. This Speed Hold value of b is determined by reading the thrust level when the actual speed of the aircraft reaches the target speed designated by placing the throttle in the Hold detent.

When the throttle lever is advanced or retarded toward the Hold detent, the engine thrust is maintained at the thrust level commanded prior to this advancing or retarding motion. A new thrust vs. TLA curve is not computed until the throttle lever is actually placed in the Hold detent. If prior to reaching the Hold detent, the throttle lever is moved away from the Hold detent, the commanded thrust continues to be maintained until the throttle lever angle corresponds to the commanded thrust whereupon the engine thrust is then adjusted as a function of TLA for any further changes in TLA.

With regard to other parameters of the equation, the constant m, which equals the selected slope (throttle sensitivity), is a selected incremental change in commanded thrust per incremental change in throttle position. The value of m is determined analytically based upon a number of factors such as (1) the effect of an incremental change in thrust upon aircraft speed and (2) the minimum change in throttle position which can be comfortably repeated by a typical pilot. For example, it may be determined that the minimum repeatable throttle movement by a typical pilot is one eighth of an inch. Also it may be determined that the minimum desired change in airspeed corresponding to the minimum throttle movement is one knot which corresponds to a change in thrust of one hundred pounds. In this instance, the desired throttle sensitivity m would be 1/800, i.e., one inch of throttle movement equals eight hundred pounds of thrust change. Since the change in thrust necessary to achieve a desired change in aircraft airspeed is dependent upon such factors as aircraft weight and configuration, this thrust value will be recalculated on a real time basis.

Figure 10:
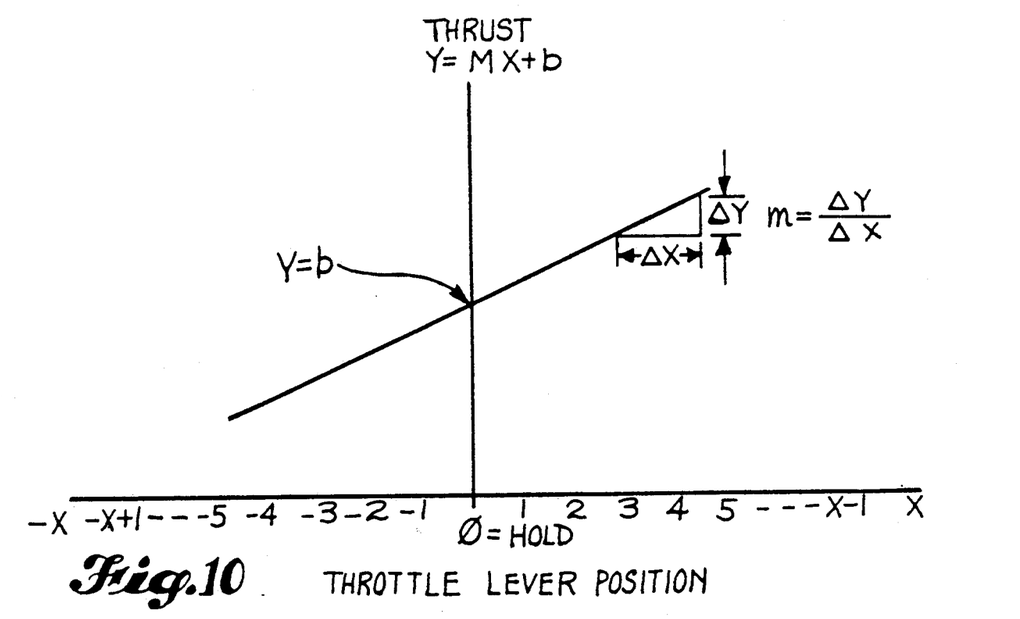
FIG. 10 is an exemplary graph of thrust (y) vs throttle position (x).

In the present embodiment, x equals the position of the throttle relative to the Hold detent. As shown in FIG. 10, when the throttle is in the Hold detent, x is zero and y is equal to the thrust value b. Moving the throttle forward of the Hold detent position generates increasingly larger positive values of x; whereas retarding the throttle rearward of the Hold detent position generates increasingly larger negative values of x. These values of x are used to solve the equation $y=mx+b$ to obtain the new thrust values. In an exemplary embodiment the throttle position is defined as an angle which is measured about the point of rotation of the throttle lever. This angle is positive when movement is forward of a defined datum position and negative when movement is rearward of that datum position. In the present embodiment the defined datum position is the Hold position.

The upper boundary U/B and lower boundary L/B are functions of the required range of thrust changes needed to effect a desired speed change. For example, by analytical methods it may be determined that on final approach to landing the desired range of speed changes should be plus or minus five knots. By conventional methods the throttle controller determines that a plus-or-minus five knot speed change requires a thrust range of plus-or-minus x pounds of thrust, which in turn, is used as the upper and lower boundaries, respectively, of the folded scale. For cruise operation, the desired speed range may be larger thereby requiring different upper and lower boundaries for the folded scale.

In addition, the maximum range of travel of the throttle is determined experimentally based upon optimum use by the pilot. The thrust levels at the idle point 102 and take-off-and-climb point 104 are established by the engine manufacturer.

The faired end curves which connect the lower boundaries (L/B) to the idle point 102, and which connect the upper boundaries (U/B) to the take-off-and-climb point 104 of the thrust vs. TLA curve, are developed experimentally. However, all end curves 106 are defined to have the following properties: (1) their slopes are always positive, (2) the end curves do not have any discontinuities, (3) the end curves are smoothly faired to the straight line segment (i.e., the derivative of the equation defining the straight line equals the derivative of the equation defining the end curve at the point of transition between the two equations), (4) there are no undefined outputs or infinite outputs, (5) there are no stepped outputs.

Since it is known that increased thrust is necessary to maintain airspeed during aircraft turns, b (engine thrust to maintain current airspeed) is recalculated in a conventional manner as a function of aircraft bank angle. Therefore, in the event the throttle is manually moved out of available.

Figure 7:
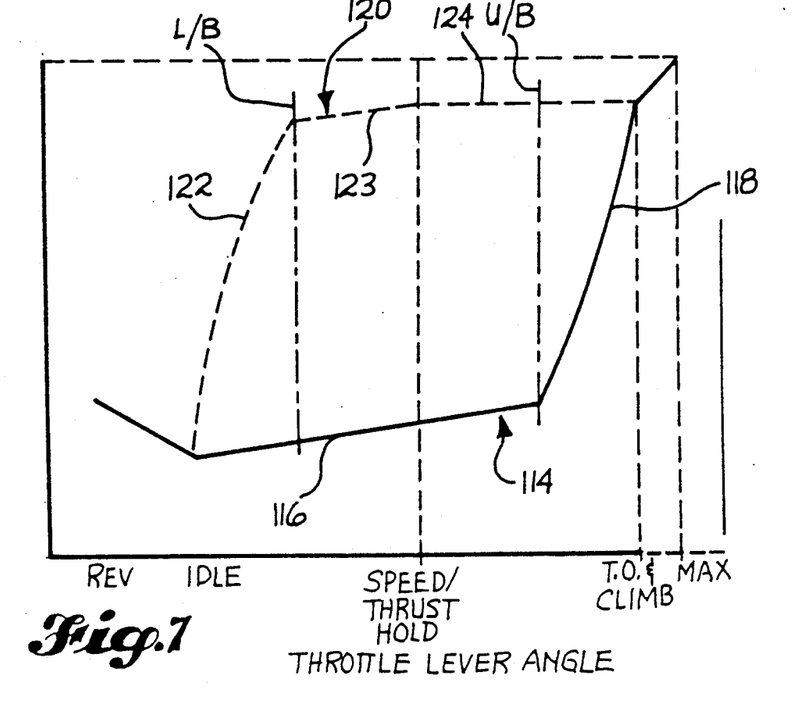
FIG. 7 is an exemplary "folded scale" graph of engine thrust vs. TLA during idle and takeoff for the throttle system of the present invention.

As a further example of a thrust vs. TLA curve for a taxi and takeoff sequence, reference is made to FIG. 7. Prior to initial taxi, curve 114 is generated in a manner to include a lower taxi segment 116 and an upper climb segment 118. Once airborne after takeoff, there is calculated a new curve 120 which is formed by a line segment 122, a line segment 123 at sensitivity slope m, and a level-off constant thrust segment represented by a level line 124. The constant thrust segment shows that as the throttle is retarded from the takeoff and climb setting to the Hold detent, the takeoff and climb thrust is maintained. It should be noted that since climb is a Thrust mode selection, the controller is not holding speed.

Figure 8:
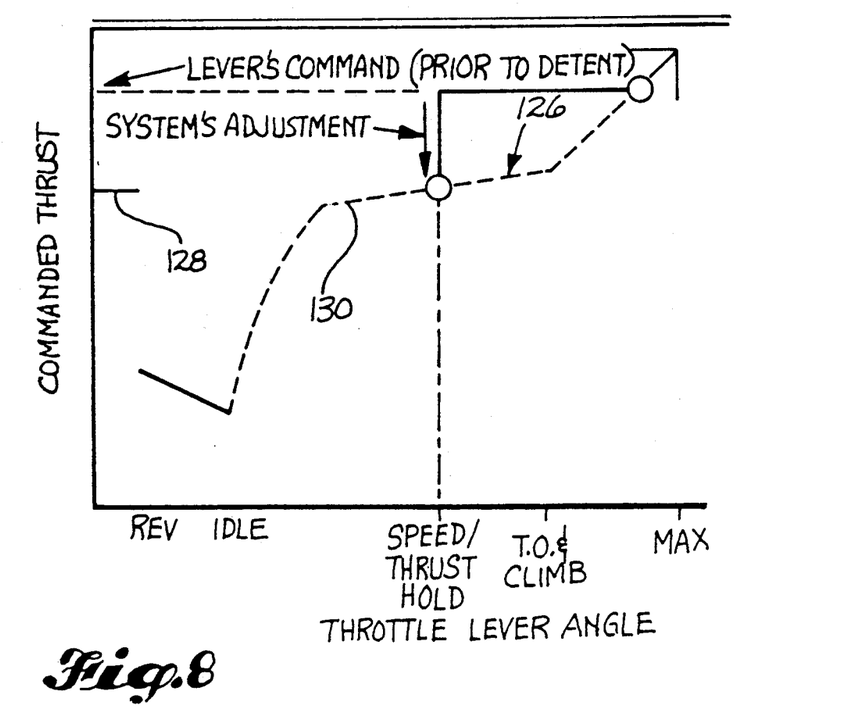
FIG. 8 is an exemplary "folded scale" graph of engine thrust vs. TLA during climbout and level-off for the throttle system of the present invention.

In the event it is desired to control the climbout by using the Speed Hold mode, the Speed/Thrust button (54 or 22) is placed in the Speed position and the throttle lever 38 is placed in the Hold detent. This causes the thrust to be modulated so as to maintain the speed which existed at the instant that throttle lever 38 was placed in Hold position. During manual level-off, this speed is held by continuous modulation of engine thrust. Once the aircraft is level and the desired speed has been reached, a new thrust vs. TLA curve (line 126 in FIG. 8) is calculated about the thrust level (indicated by the number 128) required to hold that speed in level flight. This curve is generated about the Hold detent position at the new thrust level in the manner discussed previously.

Figure 9:
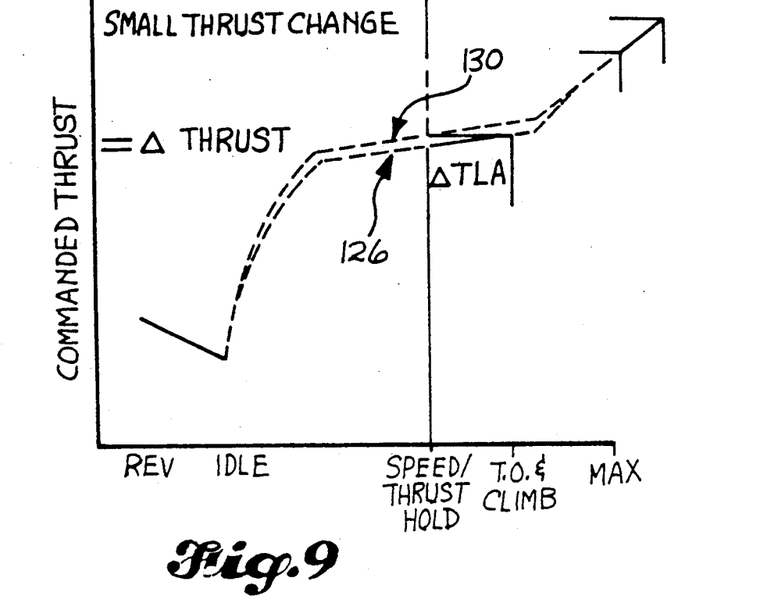
FIG. 9 is an exemplary "folded scale" graph of engine thrust vs TLA curve (126) for the throttle system of the present invention in which there is illustrated a second thrust vs. TLA curve (130) required to maintain a small airspeed increase during level flight.

If a speed adjustment is necessary after leveling off, throttle movement out of the Hold detent and along the thrust vs. TLA curve 126 (FIG. 8) generates thrust commands which allow for small throttle changes to achieve small speed changes. When the new speed is reached, and the throttle is returned to the Hold position, a new Thrust vs. TLA curve (line 130 in FIG. 9) is calculated.

If a Flight Plan mode from the MCP is desired, the Speed Hold mode is selected using buttons 54 or 22. In addition, the Flight Plan 24 is engaged, and the throttle lever 38 is placed in Hold. The Priority Manager then will follow the speed/thrust requirements of the flight plan as calculated by the flight management computer system. Any movement of the throttle lever 38 out of the Hold detent by the pilot commences thrust vs. TLA operation and allows for operation along the entire thrust vs. TLA curve currently calculated. All calculated curves include idle, takeoff and climb, and maximum thrust availability.

In the present invention, there is no requirement to deselect previously selected modes to achieve pilot override. That is, movement of the throttle lever out of the Hold detent always results in thrust vs. TLA operation and thereby overrides any other selected mode. Reactivation of the overridden mode requires only placement of the throttle lever back into the Hold detent. Overridden modes are automatically reinstated provided they have not otherwise been deselected.

What is claimed is:

1. An engine throttle control system comprising:
   a. throttle control means including (i) means for sensing a position of a throttle lever which is movable between a first position and a second position in a manner that there are a plurality of throttle lever positions between the first position and the second position, and (ii) means for generating a signal of the sensed throttle lever position; and b. means, responsive to the sensed position signal, for generating a control signal for controlling an output level of the engine as a function of the throttle lever position, the control signal generating means including 1) means for generating the control signal in a manner such that a plurality of intermediate positions of the throttle lever between the first position and the second position selects a first range of engine output levels, and such that a reference position of the throttle located between the first throttle position and the second throttle position selects a mode of engine operation in which the engine output level is maintained at a selected level when the throttle lever is moved from the intermediate throttle lever position to the reference position, and 2) means, responsive to the sensed position signal of the throttle lever in the reference position, for generating control signals for selecting a second range of engine output levels which corresponds to the intermediate throttle lever positions and which replaces the first range of selected engine output levels, in a manner that when the throttle lever is moved from the reference throttle lever position to the intermediate throttle lever positions, the second range of engine output levels is selected.

2. The engine throttle system as set forth in claim 1 wherein the control signal generating means includes:

a. means for generating the control signal in a manner that the second range includes a lower engine output level which is selected when the throttle lever is in the first position and an upper engine output level which is selected when the throttle lever is in the second position; and b. means for generating the control signal to select the second range of engine output levels so that the engine output level generated when the throttle lever is in the reference position is between the lower engine output level and the upper engine output level of the second range.

3. The engine throttle system as set forth in claim 2 wherein the control signal generating means includes means for generating the control signal to select the second range of engine output levels so that the thrust generated when the throttle lever is in the reference position is midway between the lower engine output level and the upper engine output level of the second range.

4. The engine throttle system as set forth in claim 3 wherein:

a. the reference position is located midway between the first position and the second position; and b. the throttle control means includes means for generating the control signal so that when the throttle lever is moved from the reference position (i) to the first position, the engine output level is decreased by a first incremental amount to the lower engine output level, and ii) to the second position, the engine output level is increased by a second incremental amount, which is equal to the first incremental amount, to the upper engine output level.

5. The throttle system as set forth in claim 3 wherein the control signal generating means includes means for determining solutions to the equation $y = mx + b$, wherein y is the value of the second engine output level, x represents an increment of movement of the throttle lever between the first position and the second position, b is an engine thrust level generated when the throttle lever is in the reference position, and m is a selected change in engine output level per change in throttle lever movement increment.

6. The throttle system as set forth in claim 1 wherein the control signal generating means includes means for automatically controlling engine output level when the throttle lever is in the reference position.

7. The engine throttle system as set forth in claim 6 wherein the control signal generating means includes means for generating the control signal when the throttle lever is moved from the intermediate position to the reference position such that the engine output level existing when the throttle lever is moved to the reference position is maintained.

8. The engine throttle system as set forth in claim 6 wherein the control signal generating means includes means for generating the control signal so as to select the second range of engine output levels relative to a thrust level existing when the throttle lever is placed in the reference position so that a thrust increment between the lower engine output level of the second range and the existing thrust level is equal to a thrust increment between the upper engine output level and the existing thrust level.

9. The throttle control system as set forth in claim 6 wherein the control signal generating means includes means for generating the control signal so as to select the engine output level for automatically controlling engine operation as a function of the thrust level of the engine existing when the throttle lever is placed in the reference position.

* * * * *